United States Patent
Zhang et al.

(10) Patent No.: US 11,202,333 B2
(45) Date of Patent: Dec. 14, 2021

(54) LAYER 2 PROCESSING METHOD, CENTRAL UNIT AND DISTRIBUTED UNIT

(71) Applicant: CHINA ACADEMY OF TELECOMMUNICATIONS TECHNOLOGY, Beijing (CN)

(72) Inventors: Dajun Zhang, Beijing (CN); Aijuan Liu, Beijing (CN); Jiancheng Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/760,237

(22) PCT Filed: Sep. 19, 2018

(86) PCT No.: PCT/CN2018/106449
§ 371 (c)(1),
(2) Date: Apr. 29, 2020

(87) PCT Pub. No.: WO2019/095840
PCT Pub. Date: May 23, 2019

(65) Prior Publication Data
US 2020/0323016 A1 Oct. 8, 2020

(30) Foreign Application Priority Data
Nov. 15, 2017 (CN) .......................... 201711128511.1

(51) Int. Cl.
*H04W 76/20* (2018.01)
*H04W 12/037* (2021.01)
(Continued)

(52) U.S. Cl.
CPC ......... *H04W 76/20* (2018.02); *H04W 12/037* (2021.01); *H04W 12/0431* (2021.01);
(Continued)

(58) Field of Classification Search
CPC ............... H04W 76/25; H04W 12/037; H04W 36/0011; H04W 36/0055; H04W 12/0431;
(Continued)

(56) References Cited

U.S. PATENT DOCUMENTS

2015/0319801 A1* 11/2015 Lee ................... H04W 74/0833
370/329
2017/0208516 A1 7/2017 Kubota et al.
(Continued)

FOREIGN PATENT DOCUMENTS

| CN | 102123517 A | 7/2011 |
|---|---|---|
| CN | 102238720 A | 11/2011 |

(Continued)

OTHER PUBLICATIONS

3GPP TS 38.401 V0.4.1 (Oct. 2017) (Year: 2017).*
(Continued)

*Primary Examiner* — Mandish K Randhawa
(74) *Attorney, Agent, or Firm* — Harness, Dickey & Pierce, P.L.C.

(57) ABSTRACT

A layer 2 processing method, a CU and a DU are provided. The layer 2 processing method includes: sending channel reconstruction indication information to the DU; receiving a response message sent by the DU; generating an RRC reconfiguration message based on the response message; and sending the RRC reconfiguration message to a UE, and performing, by the UE, a corresponding operation.

17 Claims, 5 Drawing Sheets

(51) Int. Cl.
  *H04W 12/0431* (2021.01)
  *H04W 80/02* (2009.01)
  *H04W 88/08* (2009.01)
  *H04W 92/04* (2009.01)
  *H04W 92/10* (2009.01)

(52) U.S. Cl.
  CPC .......... *H04W 80/02* (2013.01); *H04W 88/085* (2013.01); *H04W 92/04* (2013.01); *H04W 92/10* (2013.01)

(58) Field of Classification Search
  CPC ..... H04W 56/00; H04W 76/20; H04W 92/10; H04W 80/02; H04W 92/12; H04W 88/085; H04W 92/04
  See application file for complete search history.

(56) References Cited

U.S. PATENT DOCUMENTS

| | | | |
|---|---|---|---|
| 2019/0223251 A1 | 7/2019 | Jiang et al. | |
| 2019/0387444 A1* | 12/2019 | Byun | H04W 36/0072 |
| 2020/0178332 A1* | 6/2020 | Sharma | H04W 76/27 |
| 2020/0196374 A1* | 6/2020 | Lim | H04W 76/27 |

FOREIGN PATENT DOCUMENTS

| | | |
|---|---|---|
| CN | 104584605 A | 4/2015 |
| CN | 106538037 A | 3/2017 |
| WO | WO-2014/112262 A1 | 7/2014 |

OTHER PUBLICATIONS

3GPP TS 38.473 V0.4.0 (Oct. 2017) (Year: 2017).*
3rd Generation Partnership Project, "Technical Specification Group Radio Access Network; NG-RAN; F1 application protocol (F1AP) (Release 15)", 3GPP TS 38.473 V0.3.0, (Sep. 30, 2017).
Huawei, "Clarifications CR", 3GPP TSG RAN2 Meeting #99bis,R2-1711850,(Oct. 13, 2017).
Huawei, "NG Reset", 3GPP TSG RAN WG3 Meeting #97bis,R3-173902, (Oct. 13, 2017).
International Search Report PCT/ISA/210 and Written Opinion of the International Searching Authority PCT/ISA/237 for International Application No. PCT/CN2018/106449 dated Dec. 25, 2018.
Chinese Office Action for Chinese Application No. 201711128511.1 dated Feb. 3, 2020.
Partial Supplementary European Search Report dated Dec. 4, 2020 for Application No. 18879987.8.
Huawei, "pCR on mobility aspects to 38.401", 3GPP TSG-RAN3 Meting #97 bis, R3-174124, Oct. 9-13, 2017, Prague, Czech.
Huawei, Capturing agreements from RAN3#97 in 38.473, 3GPP TSG-RAN WG3 Meeting #97bis, R3-173896, Oct. 9-13, 2017, Prague, Czech.
Ericsson, "Security Configuration for handover to LTE-5GC (TP 36.331)", 3GPP TSG-RAN WG2 #102, R2-1807015, May 21-25, 2018, Busan, South Korea.
Extended European Search Report dated Mar. 12, 2021 for Application No. EP 18 87 9987.8.
ZTE, "UE radio bearer management over F1 interface for TS38. 473", 3GPP TSG RAN WG3 NR#97, R3-172921, Berlin, Germany, Aug. 21-25, 2017.
Nokia, Nokia Shanghai Bell, KT, "Inter-gNB-DU Mobility procedure", Agenda Item: 10.10.1.6, 3GPP TSG-RAN WG3 Meeting #97bis, R3-173558, Prague, Czech Republic, Oct. 9-13, 2017.
Samsung, KT, "Discussions on mobility procedures within CU-DU split", Agenda item 10.10.1.6, 3GPP TSG-RAN WG3 Meeting #97bis, R3-173849, Prague, Czech, October 9-13, 2017.
Korean Office Action dated Mar. 19, 2021 for KR Application No. 10-2020-7013535.
Vodafone Group, "Inter DU Mobility", Agenda Item 10.10.1.6, 3GPP TSG-RAN WG3 97, R3-172669, Berlin, Germany, Aug. 21-25, 2017.
LG Electronics Inc., "Issues on inter-gNB-DU mobility procedure", Agenda item 10.10.1.6, 3GPP TSG-RAN WG3 Meeting #97bis, R3-173786, Prague, Czech Republic, Oct. 9-13, 2017.
NEC, "L1/L2 resource configuration Information in F1AP", Agenda item 10.10.2.2, 3GPP TSG-RAN3#97bis, R3-173815, Prague, Czech Republic, Oct. 9-13, 2017.

* cited by examiner

LAYER 2 PROCESSING METHOD, CENTRAL UNIT AND DISTRIBUTED UNIT

CROSS-REFERENCE TO RELATED APPLICATIONS

This application is a national phase under 35 U.S.C. § 371 of PCT International Application No. PCT/CN2018/106449 which has an International filing date of Sep. 19, 2018, which claims priority to Chinese Patent Application No. 201711128511.1, filed Nov. 15, 2017, the entire contents of each of which are hereby incorporated by reference.

TECHNICAL FIELD

The present disclosure relates to the field of communication technology, in particular to a layer 2 processing method, a central unit (CU) and a distributed unit (DU).

BACKGROUND

In the future development of mobile communication systems, in order to better meet the needs of users and greatly increase the network capacity and throughput, it will inevitably introduce more transmission nodes and larger transmission bandwidth. In a 5th-Generation (5G) telecommunication system, it would be an inevitable trend to introduce a high frequency small station in order to have a larger bandwidth and a larger transmission rate. Because of the local centralization management of the high-frequency small station, it will result in a centralized processing gain, a CU-DU architecture is introduced.

Currently, in a Long Term Evolution (LTE) system, nodes on a network side are mostly connected in a wired manner, that is, a plurality of base stations eNBs are connected by a wired link, and an eNB and a core network node, such as a Mobility Management Entity (MME) or a Serving GateWay (S-GW), are also connected by a wired link. In a multi-connection technique, a Main Node (MN) may trigger a synchronization reconfiguration procedure of a Slave Node (SN) through a SN modification procedure.

In the CU-DU architecture, the base station gNB includes a CU and a DU, the CU is responsible for the main functions of the gNB, such as mobility management and Radio Resource Control (RRC) of a User Equipment (UE), the DU is responsible for the sub-functions of the gNB, and the operation of the DU is controlled by the CU.

In the related art, all Radio Access Network (RAN) operations are performed at eNB, and the flow is simple and clear. However, after the introduction of the CU-DU architecture, there is no explicit solution to how the CU and DU cooperate to perform important functions including bearer conversion, security key update, and the like.

SUMMARY

An embodiment of the present disclosure provides a layer 2 processing method, a CU and a DU, so as to determine how the CU and DU cooperate in the CU-DU architecture to perform important functions including bearer conversion, security key update, and the like.

In the first aspect, the present disclosure provides in some embodiments a layer 2 processing method applied for a central unit (CU), including: sending channel reconstruction indication information to a distributed unit (DU); receiving a response message sent by the DU; generating a Radio Resource Control (RRC) reconfiguration message based on the response message; and sending the RRC reconfiguration message to a user equipment (UE), and performing, by the UE, a corresponding operation.

In the second aspect, the present disclosure provides in some embodiments a layer 2 processing method applied for a DU, including: receiving channel reconstruction indication information sent by a CU; sending a response message to the CU, generating an RRC reconfiguration message by the CU based on the response message, and sending the RRC reconfiguration message to a UE, so that the UE performs a corresponding operation.

In the third aspect, the present disclosure provides in some embodiments a CU, comprising a wired interface, a memory, a processor, a transceiver, and a computer program stored on the memory and executed by the processor, wherein, the wired interface is configured to send channel reconstruction indication information to the DU and receive a response message sent by the DU; the processor is configured to read a program in the memory and perform a process of generating an RRC reconfiguration message based on the response message; the transceiver is configured to send the RRC reconfiguration message to a UE, and the UE performs a corresponding operation.

In the fourth aspect, the present disclosure provides in some embodiments a DU comprising a wired interface, a memory, a processor, a transceiver, and a computer program stored on the memory and executed by the processor, the wired interface is configured to receive channel reconstruction indication information sent by a CU, send a response message to the CU, generate an RRC reconfiguration message by the CU based on the response message, and send the RRC reconfiguration message to the UE, so that the UE performs a corresponding operation.

In the fifth aspect, the present disclosure provides in some embodiments a network unit, including a processor, a memory, and a computer program stored on the memory and executed by the processor, wherein the computer program is executed by the processor to implement the layer 2 processing method.

In the sixth aspect, the present disclosure provides in some embodiments a computer readable storage medium having a computer program stored thereon, wherein the computer program is executed by a processor to implement the layer 2 processing method.

In the embodiments of the present disclosure, the channel reconstruction instruction information is sent to the DU, the response message sent by the DU is received, the RRC reconfiguration message is generated based on the response message, the RRC reconfiguration message is sent to the UE, and the UE performs a corresponding operation, so that the CU can control the DU to perform a specific layer 2 behavior to meet different characteristic requirements, and the DU can also perform a specific behavior based on an instruction from the CU, thereby determining how the CU and the DU cooperates in the CU-DU architecture to implement important functions such as bearer conversion and security key update, thereby improving system efficiency and improving user experience.

BRIEF DESCRIPTION OF THE DRAWINGS

In order to more clearly describe the technical solutions of embodiments of the present disclosure or the related art, the drawings used in the description of the embodiments or the related art will be briefly introduced below. Obviously, the drawings in the following description are merely some embodiments. For a person skilled in the art, other drawings can be obtained based on these drawings without creative work.

DETAILED DESCRIPTION

In the following, the technical solutions in the embodiments of the present disclosure will be clearly and completely described with reference to the drawings. Obviously, the described embodiments are part of embodiments of the present disclosure, but not all of them. Based on the embodiments of the present disclosure, all other embodiments obtained by a person skilled in the art without creative work shall fall within the protection scope of the present disclosure.

Figure 1:
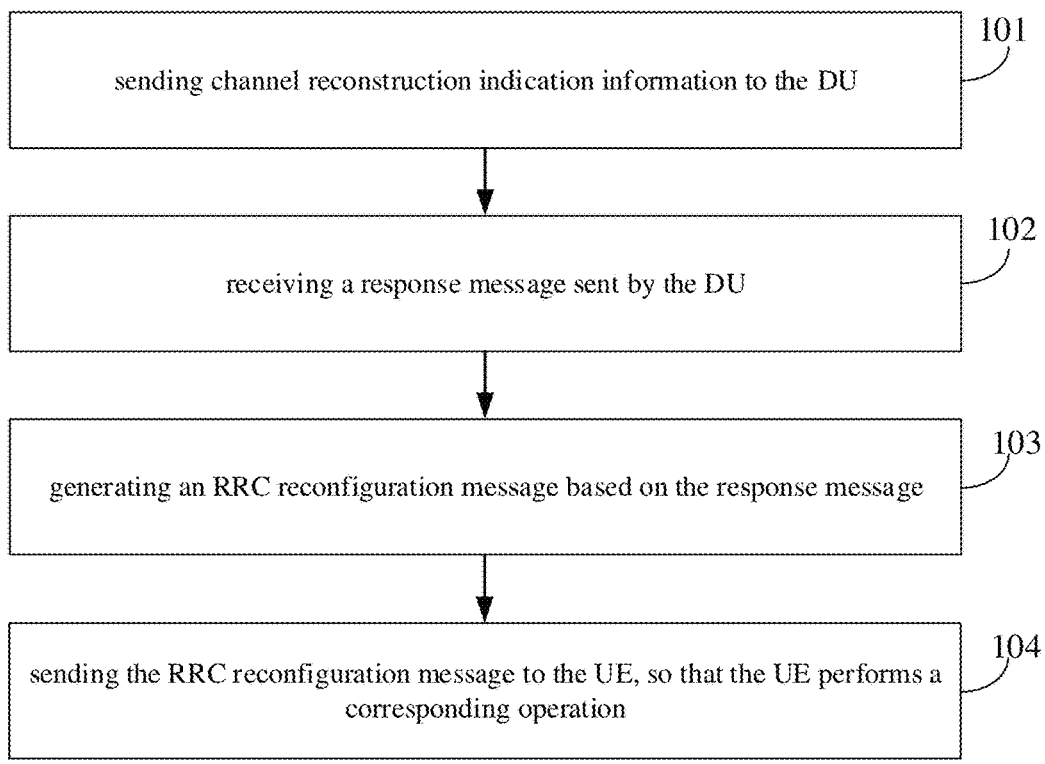
FIG. 1 is a flowchart of a layer 2 processing method according to an embodiment of the present disclosure.

Referring to FIG. 1, an embodiment of the present disclosure provides a layer 2 processing method applied to a CU, including the following steps.

Step 101: sending channel reconstruction indication information to the DU.

The channel reconstruction indication information may be layer 2 reset indication information or synchronization reconfiguration indication information, which is used to instruct the DU to perform a layer 2 reset operation (that is, a synchronization reconfiguration operation), or may be used to instruct the DU to perform a logical channel reconstruction operation on a bearer on which a logical channel needs to be reconstructed.

It should be noted that the disclosed embodiment may be applied to a CU control plane (CU-CP), that is, a layer 2 process performed by the CU-CP.

Step 102: receiving a response message sent by the DU.

Note that when the channel reconstruction indication information is used to instruct the DU to perform the layer 2 reset operation or the synchronization reconfiguration operation, the corresponding response message includes synchronization configuration parameter information, such as Random Access Channel (RACH) configuration information. When the channel reconstruction indication information is used to instruct the DU to perform the logical channel reconstruction operation on the bearer on which the logical channel needs to be reconstructed, the corresponding response message includes new logical channel identification information.

Step 103: generating an RRC reconfiguration message based on the response message.

Step 104: sending the RRC reconfiguration message to the UE, so that the UE performs a corresponding operation.

When the CU sends the RRC reconfiguration message to the UE, the CU may directly send the RRC reconfiguration message to the UE through the connection link between the CU and the UE, or may indirectly send the RRC reconfiguration message to the UE through the base station.

In the layer 2 processing method of the embodiment of the present disclosure, the channel reconstruction instruction information is sent to the DU, the response message sent by the DU is received, the RRC reconfiguration message is generated based on the response message, the RRC reconfiguration message is sent to the UE, and the UE performs a corresponding operation, so that the CU can control the DU to perform a specific layer 2 behavior to meet different characteristic requirements, and the DU can also perform a specific behavior based on an instruction from the CU, thereby determining how to cooperate between the CU and the DU under the CU-DU architecture to complete important functions such as bearer conversion and security key update, thereby improving system efficiency and improving user experience.

Figure 2:
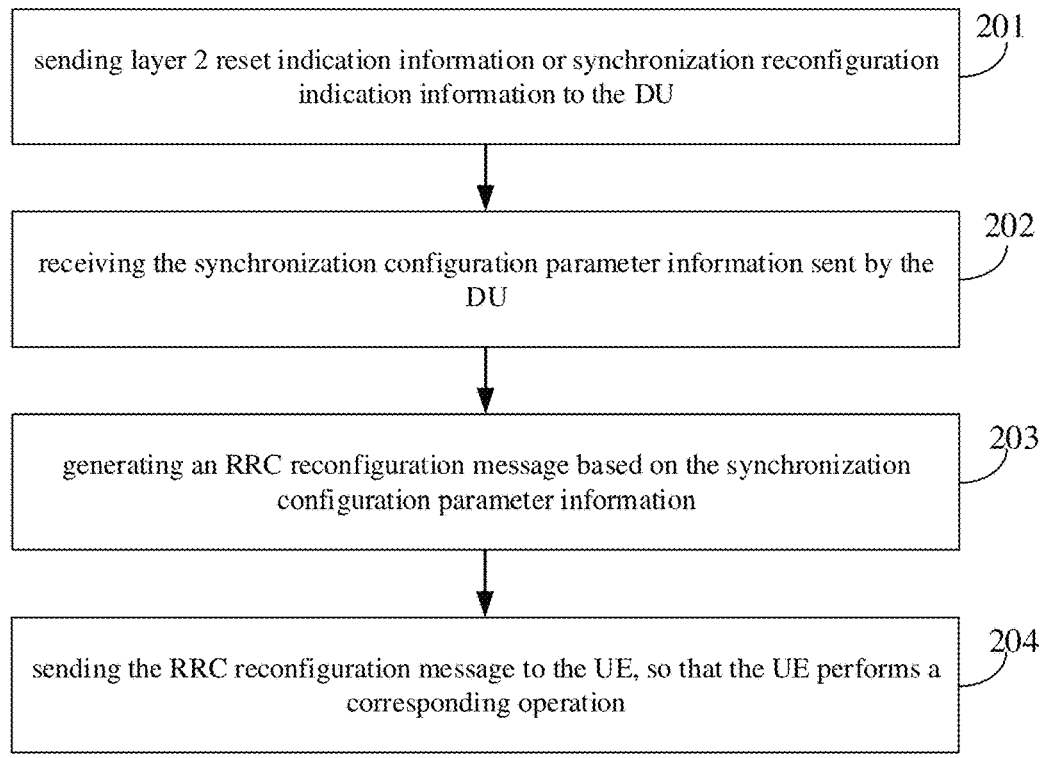
FIG. 2 is another flowchart of a layer 2 processing method according to an embodiment of the present disclosure.

Referring to FIG. 2, another embodiment of the present disclosure further provides a layer 2 processing method applied to a CU, including the following steps.

Step 201: sending layer 2 reset indication information or synchronization reconfiguration indication information to the DU.

The layer 2 reset indication information may be referred to as synchronization reconfiguration indication information, and they are the same indication information. Layer 2 reset indication information or synchronization reconfiguration indication information may be used to instruct the DU to perform a layer 2 reset operation or to instruct the DU to perform a synchronization reconfiguration operation. Layer 2 reset operations or synchronous reconfiguration operations performed by the DU include, but are not limited to, Media Access Control (MAC) reset operations, reconstruction operations of all Radio Link Control (RLC) entities, and the like.

In this embodiment of the present disclosure, a process in which the CU sends the layer 2 reset indication information or the synchronization reconfiguration indication information to the DU may be as follows.

The CU sends layer 2 reset indication information or synchronization reconfiguration indication information to the DU through one indication bit in a UE context modification message. Or, the CU sends layer 2 reset indication information or synchronization reconfiguration indication information to the DU through a UE movement instruction message.

When the CU sends the layer 2 reset indication information or the synchronization reconfiguration indication information to the DU through the UE movement instruction message, the CU may implicitly send the layer 2 reset indication information or the synchronization reconfiguration indication information to the DU by not carrying the RRC message in the UE movement instruction message; or layer 2 reset indication information or synchronization reconfiguration indication information is sent to the DU by indicating that a handover target cell is a current serving cell in the UE movement instruction message.

Step 202: receiving synchronization configuration parameter information sent by the DU.

The synchronization configuration parameter information may be carried in a response message sent by the DU to the CU, for subsequent use by the UE. When receiving the synchronization configuration parameter information sent by the DU, the CU may receive the synchronization configuration parameter information sent by the DU in an RRC container mode, that is, the DU may send the synchronization configuration parameter information in the RRC container mode. Further, the synchronization configuration parameter information transmitted by the DU may include dedicated access resource information for synchronization and/or a user identity CRNTI on a new target resource or the like.

In this embodiment of the present disclosure, the response message sent by the DU to the CU carries, in addition to the synchronization configuration parameter information, a downlink transmission address (such as a tunnel identifier) newly allocated by the DU for each Data Radio Bearer (DRB), so as to facilitate use of the CU. The newly allocated downlink transmission address may be transmitted in the form of an interface information element.

Step 203: generating an RRC reconfiguration message based on the synchronization configuration parameter information.

The RRC reconfiguration message carries synchronization configuration parameter information from the DU.

Step 204: sending the RRC reconfiguration message to the UE, so that the UE performs a corresponding operation.

Note that the corresponding operation performed by the UE is specifically a layer 2 reset operation or a reconstruction operation of logical channels corresponding to all bearers, and an uplink access operation from UE to the DU.

Thus, the layer 2 processing method of the disclosed embodiment may cause the CU to control the DU to perform a specific layer 2 behavior, and the DU to perform a specific behavior based on an instruction from the CU, so that the CU and the DU may cooperate to control the UE to perform a corresponding layer 2 reset operation or a reconstruction operation of logical channels corresponding to all bearers.

In the disclosed embodiment, after the CU sends the layer 2 reset indication information or the synchronization reconfiguration indication information to the DU, the DU performs a layer 2 reset operation or a reconstruction operation (that is, a synchronization reconfiguration operation) of logical channels corresponding to all bearers. Specifically, for the DRBs, the DU stops air interface transmission, delivers data of uplink Packet Data Convergence Protocol (PDCP) protocol data unit (PDU) on all DRBs received from the UE to the CU in an out-of-order manner, and sends downlink transmission status information or other indication information requesting transmission of new data to the CU, and at the same time, clears all data packets of each buffer corresponding to the UE. Upon receipt of downlink transmission status information or other indication information requesting transmission of new data from the DU, the CU will enable new keys of encryption and decryption for all DRBs. Once the CU receives a synchronization indication message from the UE, such as an RACH access success message, the air interface will begin to send or receive new data.

Specifically, after step 201, the method of the disclosed embodiment may further include: receiving, by the CU, uplink PDCP PDU data on all DRBs received from the UE sent by the DU, and receiving downlink transmission status information or other indication information requesting transmission of new data sent by the DU.

In order to distinguish the conventional downlink transmission status information, the downlink transmission status information may include old data transmission complete indication information.

Further, after receiving downlink transmission status information sent by the DU or other indication information requesting transmission of new data, the CU may enable a new key of encryption and decryption for all DRBs; or enable a new key of encryption and decryption for all DRBs based on the response message from the DU; or enable a new key of encryption and decryption for all DRBs based on PDCP status report information from the UE; or enable a new key of encryption and decryption for all the DRBs based on the RRC reconfiguration complete message from the UE (that is, after receiving the RRC reconfiguration complete message from the UE, a new key of encryption and decryption are enabled for all the DRBs); or enable a new key of encryption and decryption for all DRBs after a local timer expires, the local timer is enabled after the layer 2 reset indication information or the synchronization reconfiguration indication information is sent, and the duration can be preset.

Further, for a Signaling Radio Bearer (SRB), after receiving downlink transmission status information or other indication information for requesting transmission of new data transmitted by the DU, the CU may enable a new key of encryption and decryption for all the SRBs based on downlink transmission status information of any DRB or other indication information for requesting transmission of new data; or enable a new key of encryption and decryption for all SRBs based on the response message from the DU; or enable a new key of encryption and decryption for all SRBs after the local timer expires, the local timer is enabled after the layer 2 reset indication information or the synchronization reconfiguration indication information is sent, and the duration can be preset.

Figure 3:
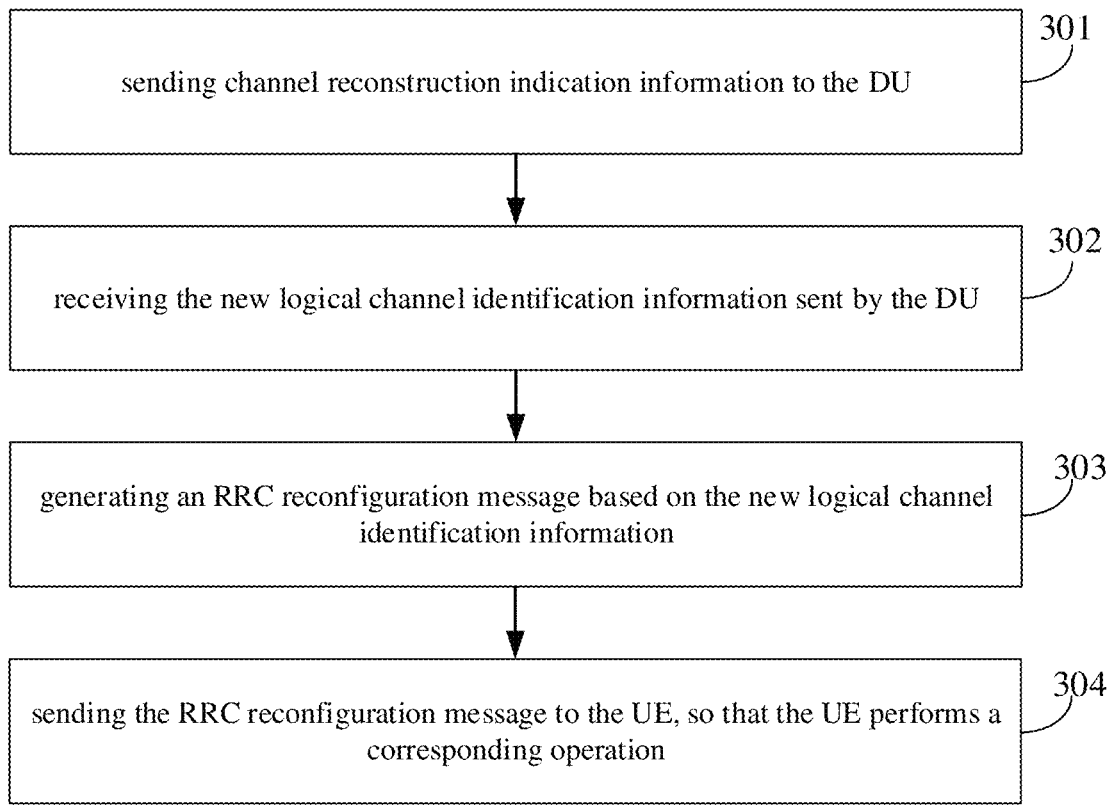
FIG. 3 is yet another flowchart of a layer 2 processing method according to an embodiment of the present disclosure.

Referring to FIG. 3, another embodiment of the present disclosure further provides a layer 2 processing method applied to a CU, including the following steps.

Step 301: sending channel reconstruction indication information to the DU.

The channel reconstruction indication information is used to indicate the bearer on which the logical channel needs to be reconstructed and instruct the DU to perform the logical channel reconstruction operation on the bearer on which the logical channel needs to be reconstructed. The logical channel reconstruction operation performed by the DU includes, but is not limited to, a reconstruction operation of related RLC entities, and the like.

In this embodiment of the present disclosure, a process in which the CU sends channel reconstruction indication information to the DU may be: sending, by the CU, channel reconstruction indication information to the DU through a display indication bit in the UE context modification message; or sending, by the CU, implicitly channel reconstruction indication information to the DU by adding or deleting the DRB in the UE context modification message.

Step 302: receiving the new logical channel identification information sent by the DU.

The new logical channel identification information may be carried in a response message sent by the DU to the CU, for subsequent use by the UE. When receiving the new logical channel identification information sent by the DU, the CU may receive the new logical channel identification information sent by the DU in the RRC container mode, that is, the DU may send the new logical channel identification information in the RRC container mode.

In this embodiment of the present disclosure, in addition to the new logical channel identification information, the response message sent by the DU to the CU may also carry a downlink transmission address (such as a tunnel identifier) that is newly allocated by the DU to a bearer on which a logical channel needs to be reconstructed, so as to facilitate use of the CU. The newly allocated downlink transmission address may be transmitted in the form of an interface information element.

Step 303: generating an RRC reconfiguration message based on the new logical channel identification information.

The RRC reconfiguration message carries new logical channel identification information from the DU.

Step 304: sending the RRC reconfiguration message to the UE, so that the UE performs a corresponding operation.

It should be noted that the corresponding operation performed by the UE is specifically a reconstruction operation of a logical channel corresponding to a bearer on which the logical channel needs to be reconstructed.

Thus, the layer 2 processing method of the disclosed embodiment may cause the CU to control the DU to perform a specific layer 2 behavior, and the DU to perform a specific behavior based on an instruction from the CU, so that the CU and the DU may cooperate to control the UE to perform a reconstruction operation of a logical channel corresponding to a bearer on which the logic channel needs to be reconstructed.

In the disclosed embodiment, after the CU sends the channel reconstruction indication information to the DU, the DU performs a logical channel reconstruction operation. Specifically, the DU delivers the uplink PDCP PDU data received from the UE on the bearer on which the logical channel needs to be reconstructed to the CU in an out-of-order manner, and sends downlink transmission status information or other indication information for requesting transmission of new data to the CU. At the same time, all data packets of each buffer corresponding to the bearer on which the logical channel needs to be reconstructed are cleared. On receipt of the downlink transmission status information or other indication information requesting transmission of new data from the DU, the CU will process the PDU corresponding to the uplink PDCP PDU data.

Specifically, after step 301, the method of the disclosed embodiment may further include: receiving, by the CU, the uplink PDCP PDU data on the bearer on which the logical channel needs to be reconstructed, which is received from the UE by the DU; and receiving the downlink transmission status information or other indication information requesting transmission of new data by the DU.

Further, after receiving the downlink transmission status information or other indication information requesting transmission of new data sent by the DU, the CU will process the PDU corresponding to the uplink PDCP PDU data.

In order to distinguish the conventional downlink transmission status information, the downlink transmission status information may optionally include old data transmission complete indication information.

Further, when a reconfiguration complete message of the UE is received, the CU may receive or transmit a new data packet for the new bearer.

Next, the processing procedure of layer 2 of Examples 1 to 4 of the present disclosure will be described with reference to FIGS. 4 to 7, respectively.

Example 1

Figure 4:
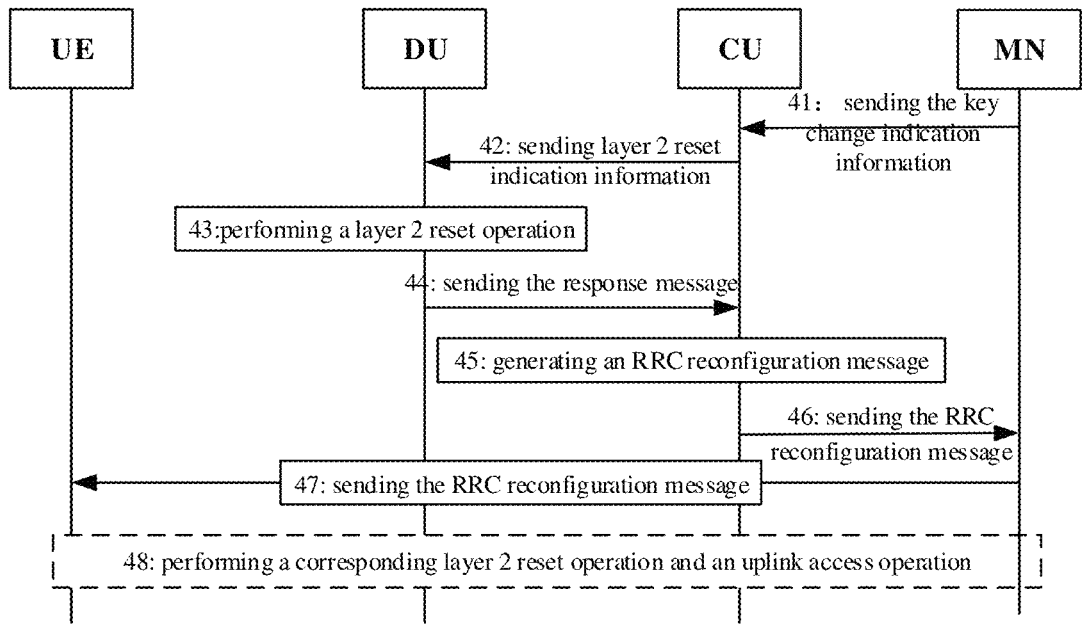
FIG. 4 is a flowchart of a layer 2 processing procedure according to an embodiment of the present disclosure.

In a multi-connection scenario, the MN sends key change indication information to the CU (or CU-CP) of the SN, or other related information that triggers the layer 2 reset of the SN to complete the corresponding layer 2 process. Specifically, as shown in FIG. 4, the processing of the layer 2 includes the following steps.

Step 41: sending, the MN, the key change indication information or other related information that triggers the layer 2 reset of the SN to the CU of the SN.

Step 42: sending, by the CU, layer 2 reset indication information (also referred to as synchronization reconfiguration indication information) to the DU to which the CU belongs.

The layer 2 reset indication information may be sent by one indication bit in the UE context modification message, or may be sent by a UE movement instruction message (but does not carry an RRC container).

Step 43: performing, by the DU, a layer 2 reset operation.

In the present disclosed example, the layer 2 reset operation performed by the DU includes, but is not limited to, a MAC reset operation, a reconstruction operation of all RLC entities, and the like.

For the DRBs, the DU will stop air interface transmission, and delivers uplink PDCP PDU data on all DRBs received from the UE to the CU in an out-of-order manner, and feeds back downlink transmission status information (which may be based on an Acknowledgement (ACK) message from the UE) or other indication information requesting transmission of new data to the CU; meanwhile, all data packets of each buffer corresponding to the UE are cleared.

Upon receipt of downlink transmission status information from the DU or other indication information requesting transmission of new data, the CU will enable a new key of encryption and decryption for all DRBs. Upon receipt by the CU of a synchronization indication message from the UE, such as an RACH access success message, the air interface will be used to begin to send or receive new data.

For the SRB, the CU may determine whether the DU reset is completed based on the downlink transmission status information of any DRB or other indication information requesting transmission of new data, and enable the new key to perform encryption and decryption after the DU reset is completed.

Step 44: after receiving the layer 2 reset indication information from the CU, generating, by the DU, a response message and sending the response message to the CU.

The response message carries synchronization configuration parameter information (such as RACH configuration information). Further, the synchronization configuration parameter information may be transmitted to the CU by means of an RRC container. The response message may also carry a downlink transmission address (such as a tunnel identifier, etc.) newly allocated by the DU for each DRB.

Step 45: generating, by the CU, an RRC reconfiguration message based on the synchronization configuration parameter information from the DU.

Step 46: sending, by the CU, the RRC reconfiguration message to the MN.

Step 47: sending, by the MN, the RRC reconfiguration message to the UE.

Step 48: After receiving the RRC reconfiguration message, performing, by the UE, a corresponding layer 2 reset operation or a reconstruction operation of logical channels corresponding to all bearers and an uplink access operation from the UE to the DU based on the synchronization configuration parameter information.

Example 2

Figure 5:
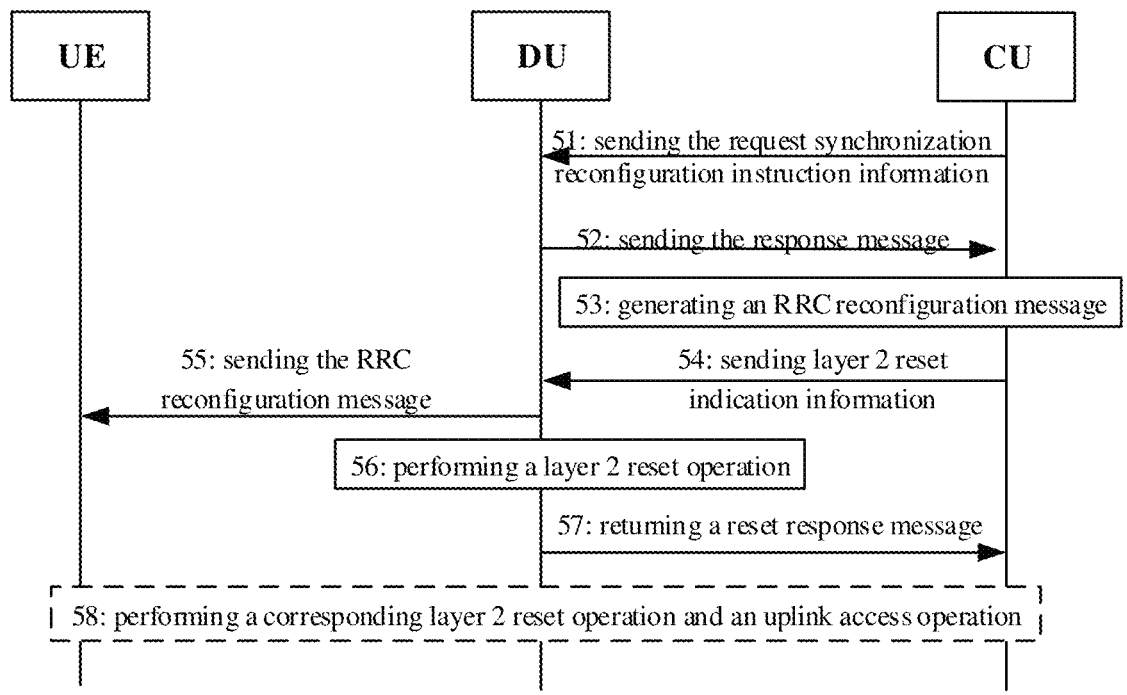
FIG. 5 is another flowchart of a layer 2 processing procedure according to an embodiment of the present disclosure.

The CU (or CU-CP) needs to change the key, or decides to trigger the layer 2 reset operation of the local node based on a preset rule. Specifically, as shown in FIG. 5, the processing of the layer 2 includes the following steps.

Step 51: sending, by the CU, the request synchronization reconfiguration instruction information to the DU to which the CU belongs.

The synchronization reconfiguration indication information may be transmitted by one indication bit in the UE context modification message.

Step 52: After receiving the synchronization reconfiguration indication information requested from the CU, generating, by the DU, a response message and sending the response message to the CU. The response message carries synchronization configuration parameter information (such as RACH configuration information), and the synchronization configuration parameter information can be sent to the CU through the RRC container.

Step 53: generating, by the CU, an RRC reconfiguration message based on the synchronization configuration parameter information from the DU.

Step 54: sending, by the CU, layer 2 reset indication information to the DU to which the CU belongs.

The layer 2 reset indication information carries an RRC reconfiguration message. The layer 2 reset indication information may be sent by one indication bit in the UE context modification message, and needs to carry the RRC container, or may be sent by the UE movement instruction message, and needs to carry the RRC container.

Step 55: delivering, by the DU, the RRC reconfiguration message from the CU to the UE.

Step 56: performing, by the DU, a layer 2 reset operation, including but not limited to a MAC reset operation, a reconstruction operation of all RLC entities, and the like. This process is the same as that of step 43, and details are not described herein.

Step 57: returning, by the DU, a reset response message to the CU. The reset response message carries a downlink transmission address (such as a tunnel identifier) newly allocated by the DU to each DRB.

Step 58: after receiving the RRC reconfiguration message, performing, by the UE, a corresponding layer 2 reset operation or a reconstruction operation of logical channels corresponding to all bearers and an uplink access operation from the UE to the DU based on the synchronization configuration parameter information.

Example 3

Figure 6:
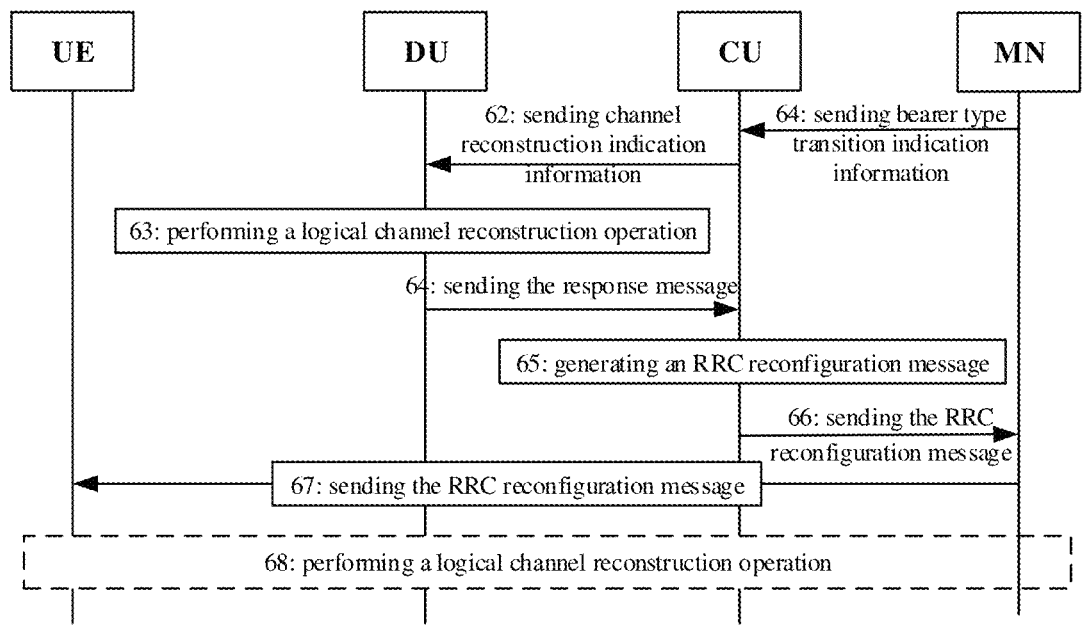
FIG. 6 is yet another flowchart of a layer 2 processing procedure according to an embodiment of the present disclosure.

In a multi-connection scenario, the MN sends bearer type transition indication information to the CU (or CU-CP) of the SN, or other related information that triggers the SN to reconstruct a logical channel to complete the corresponding layer 2 processing. Specifically, as shown in FIG. 6, the processing of the layer 2 includes the following steps.

Step 61: sending, by the MN, bearer type transition indication information or other related information that triggers the SN to reconstruct the logical channel to the CU of the SN.

Step 62: sending, by the CU, channel reconstruction indication information to the DU to which the CU belongs.

Wherein the channel reconstruction indication information is used to indicate the bearer on which the logical channel needs to be reconstructed and to instruct the DU to perform a logical channel reconstruction operation on the bearer on which the logical channel needs to be reconstructed. The channel reconstruction indication information may be transmitted by a display indication bit in the UE context modification message, or may be implicitly transmitted by adding or deleting a DRB in the UE context modification message.

Step 63: performing, by the DU, a logical channel reconstruction operation, including but not limited to a related RLC entity performing a reconstruction operation, and the like.

Specifically, the DU delivers uplink PDCP PDU data received from the UE on the bearer on which the logical channel needs to be reconstructed to the CU in an out-of-order manner, and feeds back downlink transmission status information (which may be based on an ACK message from the UE) or other indication information requesting transmission of new data to the CU. At the same time, all data packets of each buffer corresponding to the bearer on which the logical channel needs to be reconstructed are cleared.

Upon receiving the downlink transmission status information from the DU or other indication information requesting transmission of new data, the CU will process the PDU corresponding to the uplink PDCP PDU data. Upon receiving the reconfiguration complete message from the UE, the network side starts to send or receive a new data packet for the newly changed bearer.

Step 64: After receiving the channel reconstruction indication information from the CU, generating, by the DU, a response message and feeding back the response message to the CU.

The response message carries new logical channel identification information. Further, the new logical channel identification information may be transmitted to the CU through the RRC container. The response message may also carry a downlink transmission address (such as a tunnel identifier) that the DU is newly allocated to the bearer on which the logical channel needs to be reestablished.

Step 65: generating, by the CU, an RRC reconfiguration message based on the new logical channel identification information from the DU.

Step 66: sending, by the CU, the RRC reconfiguration message to the MN.

Step 67: sending, by the MN, the RRC reconfiguration message to the UE.

Step 68: After receiving the RRC reconfiguration message, performing, by the UE, a logical channel reconstruction operation corresponding to the bearer on which a logic channel needs to be reconstructed based on the new logical channel identification information.

Example 4

Figure 7:
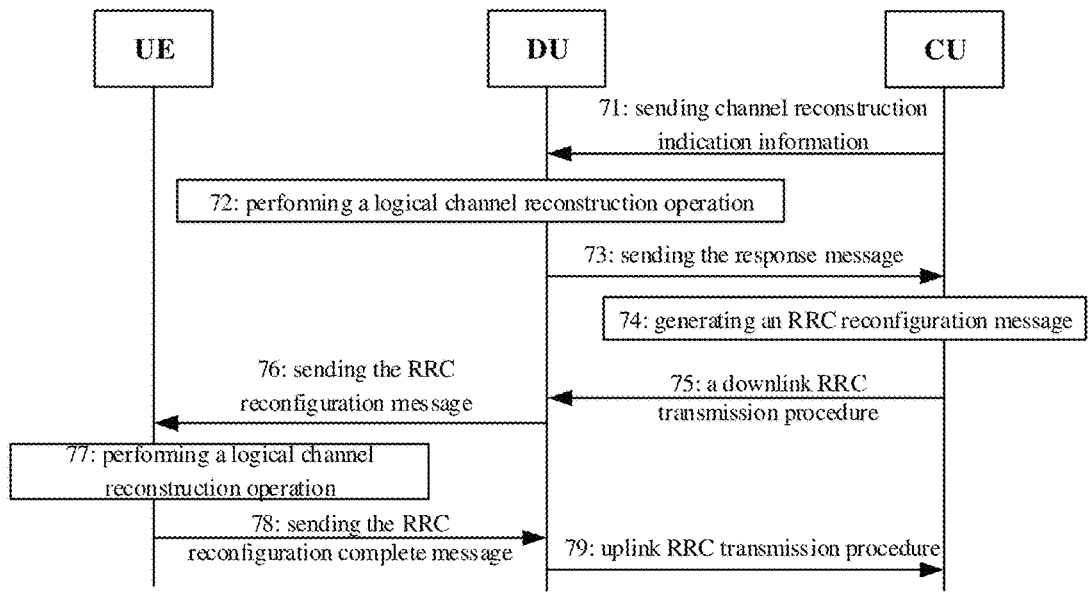
FIG. 7 is still yet another flowchart of a layer 2 processing procedure according to an embodiment of the present disclosure.

The CU (or CU-CP) decides to trigger a logical channel reconstruction operation of a bearer according to a preset rule. Specifically, as shown in FIG. 7, the processing of the layer 2 includes the following steps.

Step 71: sending, by the CU, channel reconstruction indication information to the DU to which the CU belongs.

The channel reconstruction indication information is used to indicate the bearer on which the logical channel needs to be reconstructed and to instruct the DU to perform a logical channel reconstruction operation on the bearer on which the logical channel needs to be reconstructed. The channel reconstruction indication information may be transmitted by a display indication bit in the UE context modification message, or may be implicitly transmitted by adding or deleting a DRB in the UE context modification message.

Step 72: performing, by the DU, a logical channel reconstruction operation, including but not limited to a related RLC entity performing a reconstruction operation. This process is the same as that of step 63 described above, and details are not described herein.

Step 73: After receiving the channel reconstruction indication information from the CU, generating, by the DU, a response message and feeding back the response message to the CU.

The response message carries new logical channel identification information. Further, the new logical channel identification information may be transmitted to the CU through the RRC container. The response message may also carry a downlink transmission address (such as a tunnel identifier) that the DU is newly allocated to the bearer on which the logical channel needs to be reconstucted.

Step 74: generating, by the CU, an RRC reconfiguration message based on the new logical channel identification information from the DU.

Step 75: sending, by the CU, the RRC reconfiguration message to the DU through a downlink RRC transmission procedure.

Step 76: sending, by the DU, the RRC reconfiguration message to the UE.

Step 77: After receiving the RRC reconfiguration message, preforming, by the UE, a logical channel reconstruction operation corresponding to the bearer on which the logic channel needs to be reconstructed based on the new logical channel identification information.

Step 78: returning, by the UE, the RRC reconfiguration complete message to the DU.

Step 79: sending, by the DU, the RRC reconfiguration complete message to the CU through the uplink RRC transmission process to complete the reconfiguration process.

Figure 8:
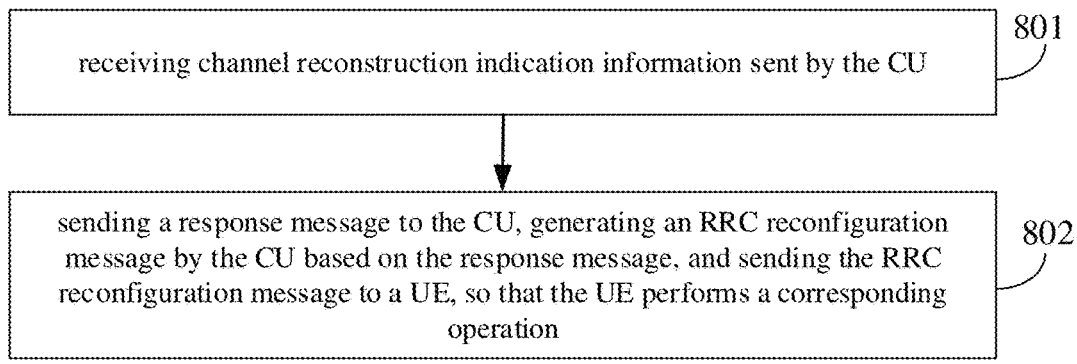
FIG. 8 is still yet another flowchart of a layer 2 processing method according to an embodiment of the present disclosure.

Further, referring to FIG. 8, another embodiment of the present disclosure further provides a layer 2 processing method applied to DU, including the following steps.

Step 801: receiving channel reconstruction indication information sent by the CU.

Step 802: sending a response message to the CU, generating an RRC reconfiguration message by the CU based on the response message, and sending the RRC reconfiguration message to a UE, so that the UE performs a corresponding operation.

In the layer 2 processing method of the embodiment of the present disclosure, a response message is sent to a CU by receiving channel reconstruction indication information sent by the CU, the CU generates an RRC reconfiguration message based on the response message, and sends the RRC reconfiguration message to the UE, so that the UE performs a corresponding operation, the CU can control the DU to perform a specific layer 2 behavior to meet different characteristic requirements, and the DU can also perform a specific behavior based on an indication from the CU, thereby determining how to cooperate between the CU and the DU in the CU-DU architecture to complete important functions including bearer conversion, security key update, and the like, thereby improving system efficiency and improving user experience.

In an embodiment of the present disclosure, optionally, step 801 includes: receiving layer 2 reset indication information or synchronization reconfiguration indication information sent by the CU, the layer 2 reset indication information or the synchronization reconfiguration indication information is used to instruct the DU to perform a layer 2 reset operation or to instruct the DU to perform a synchronization reconfiguration operation.

Optionally, the receiving layer 2 reset indication information or synchronization reconfiguration indication information sent by the CU includes: receiving the layer 2 reset indication information or synchronization reconfiguration indication information sent by the CU through one indication bit in a UE context modification message; or receiving the layer 2 reset indication information or synchronization reconfiguration indication information sent by the CU through a UE movement instruction message.

Optionally, the sending a response message to the CU includes: sending synchronization configuration parameter information to the CU.

Optionally, the sending synchronization configuration parameter information to the CU includes: sending the synchronization configuration parameter information to the CU in an RRC container mode.

Optionally, the response message carries the downlink transmission address newly allocated by the DU for each DRB.

Optionally, after the receiving layer 2 reset indication information or synchronization reconfiguration indication information sent by the CU, the method further includes: performing a layer 2 reset operation or a synchronous reconfiguration operation based on the layer 2 reset indication information or the synchronous reconfiguration indication information.

Optionally, the performing a layer 2 reset operation or a synchronous reconfiguration operation based on the layer 2 reset indication information or the synchronous reconfiguration indication information includes: stopping air interface transmission and delivering uplink PDCP PDU data on all DRBs received from the UE to the CU in an out-of-order manner; sending downlink transmission status information or other indication information requesting transmission of new data to the CU; and clearing all data packets of each buffer area corresponding to the UE.

Optionally, the downlink transmission status information includes old data transmission complete indication information.

In an embodiment of the present disclosure, optionally, the channel reconstruction indication information in step 801 may be used to indicate a bearer on which a logical channel needs to be reconstructed and to instruct the DU to perform a logical channel reconstruction operation on the bearer on which the logical channel needs to be reconstructed.

Optionally, the receiving channel reconstruction indication information sent by the CU includes: receiving the channel reconstruction indication information sent by the CU through a display indication bit in a UE context modification message; or receiving the channel reconstruction indication information implicitly transmitted by the CU by adding or deleting a DRB in a UE context modification message.

Optionally, the sending a response message to the CU includes: sending new logical channel identification information to the CU.

Optionally, the sending new logical channel identification information to the CU includes: sending the new logical channel identification information to the CU through an RRC container mode.

Optionally, the response message carries downlink transmission address newly allocated by the DU for the bearer on which the logical channel needs to be reconstructed.

Optionally, after receiving the channel reconstruction indication information sent by the CU, the method further includes: performing a logical channel reconstruction operation for the bearer on which the logical channel needs to be reconstructed based on the channel reconstruction indication information.

Optionally, the performing a logical channel reconstruction operation for a bearer on which the logical channel needs to be reconstructed based on the channel reconstruction indication information includes: delivering uplink PDCP PDU data received from the UE on a bearer on which the logical channel needs to be reconstructed to the CU in out-of-order order; sending downlink transmission status information or other indication information requesting transmission of new data to the CU; and clearing all data packets of each buffer corresponding to the bearer on which the logical channel needs to be reconstructed.

Optionally, the downlink transmission status information includes old data transmission complete indication information.

The above-described embodiments illustrate the layer 2 processing method of the present disclosure, and the CU and DU of the present disclosure will be described below in conjunction with the examples and the accompanying drawings.

Figure 9:
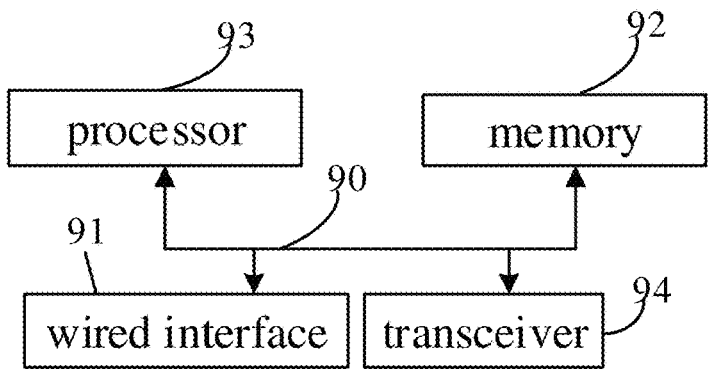
FIG. 9 is a schematic diagram of a CU according to an embodiment of the present disclosure.

Referring to FIG. 9, an embodiment of the present disclosure also provides a CU including a wired interface 91, a memory 92, a processor 93, a transceiver 94, and a computer program stored on the memory 92 and executed by the processor 93.

The wired interface 91 is configured to send channel reconstruction indication information to the DU and receive a response message sent by the DU.

The processor 93 is configured to read a program in the memory 92 and perform a process of generating an RRC reconfiguration message based on the response message.

The transceiver 94 is configured to send the RRC reconfiguration message to a UE, which performs a corresponding operation.

The CU of the embodiment can control the DU to perform a specific layer 2 behavior to meet different characteristic requirements, and the DU can also perform a specific behavior based on an instruction from the CU, so as to determine how the CU and the DU cooperate in the CU-DU architecture to complete important functions including bearer conversion, security key update, and the like, thereby improving system efficiency and user experience.

In the disclosed embodiment, optionally, the wired interface 91 is further configured to: send layer 2 reset indication information or synchronization reconfiguration indication information to the DU; the layer 2 reset indication information or the synchronization reconfiguration indication information is used to instruct the DU to perform a layer 2 reset operation or to instruct the DU to perform a synchronization reconfiguration operation.

Optionally, the wired interface 91 is further configured to: send the layer 2 reset indication information or synchronization reconfiguration indication information to the DU through an indication bit in a UE context modification message; or send the layer 2 reset indication information or synchronization reconfiguration indication information to the DU through a UE movement instruction message.

Optionally, the wired interface 91 is further configured to: implicitly send the layer 2 reset indication information or synchronization reconfiguration indication information to the DU by not carrying an RRC message in the UE movement instruction message; or send the layer 2 reset indication information or synchronization reconfiguration indication information to the DU by indicating that a handover target cell is a current serving cell in the UE movement instruction message.

Optionally, the wired interface 91 is further configured to: receive synchronization configuration parameter information sent by the DU.

Optionally, the wired interface 91 is further configured to: receive the synchronization configuration parameter information sent by the DU through an RRC container mode.

Optionally, the synchronization configuration parameter information includes dedicated access resource information for synchronization and/or user identification on a new target resource.

Optionally, the response message carries the downlink transmission address newly allocated by the DU for each DRB.

Optionally, after sending layer 2 reset indication information or synchronization reconfiguration indication information to the DU, the wired interface 91 is further configured to: receive uplink PDCP PDU data on all DRBs received from the UE sent by the DU, and receiving downlink transmission status information or other indication information requesting transmission of new data sent by the DU.

Optionally, after receiving downlink transmission status information sent by the DU or other indication information requesting transmission of new data, the processor 93 is further configured to: enable a new key of encryption and decryption for all DRBs; or enable a new key of encryption and decryption for all DRBs based on a response message from the DU; or enable a new key of encryption and decryption for all DRBs based on PDCP status report information from the UE; or enable a new key of encryption and decryption for all DRBs based on an RRC reconfiguration complete message from the UE; or enable a new key of encryption and decryption for all DRBs after a local timer is expired, the local timer is started after sending the layer 2 reset indication information or synchronization reconfiguration indication information.

Optionally, the downlink transmission status information includes old data transmission complete indication information.

Optionally, after receiving downlink transmission status information sent by the DU or other indication information requesting transmission of new data, the processor 93 is further configured to: enable a new key of encryption and decryption for all SRBs based on downlink transmission status information of any DRB or other indication information requesting transmission of new data; or enable a new key of encryption and decryption for all SRBs based on a response message from the DU; or enable a new key of encryption and decryption for all SRBs after a local timer is expired, the local timer is started after sending the layer 2 reset indication information or synchronization reconfiguration indication information.

Alternatively, the corresponding operation performed by the UE is a layer 2 reset operation or a reconstruction operation of logical channels corresponding to all bearers.

Optionally, the channel reconstruction indication information is used to indicate a bearer on which a logical channel needs to be reconstructed and to instruct the DU to perform a logical channel reconstruction operation for the bearer on which the logical channel needs to be reconstructed.

Alternatively, the wired interface 91 is further configured to: send the channel reconstruction indication information to the DU through a display indication bit in a UE context modification message; or implicitly send the channel reconstruction indication information to the DU by adding or deleting a DRB in a UE context modification message.

Alternatively, the wired interface 91 is further configured to: receive new logical channel identification information sent by the DU.

Alternatively, the wired interface 91 is further configured to: receive the new logical channel identification information sent by the DU through an RRC container mode.

Optionally, the response message carries downlink transmission address newly allocated by the DU for the bearer on which the logical channel needs to be reconstructed.

Optionally, after sending the channel reconstruction indication information to the DU, the wired interface 91 is further configured to: receive uplink PDCP PDU data on a bearer on which a logical channel needs to be reconstructed received from the UE sent by the DU, and receiving downlink transmission status information or other indication information requesting transmission of new data sent by the DU.

Optionally, after receiving downlink transmission status information sent by the DU or other indication information requesting transmission of new data, the processor 93 is further configured to: process a PDU corresponding to the uplink PDCP PDU data.

Optionally, the downlink transmission status information includes old data transmission complete indication information.

Optionally, the corresponding operation performed by the UE is a reconstruction operation of the logical channel corresponding to the bearer on which the logical channel needs to be reconstructed.

In FIG. 9, the bus architecture is represented by a bus 90, which may include any number of interconnected buses and bridges, which connect together various circuits including one or more processors represented by a processor 93 and a memory represented by a memory 92. The wired interface 91 is the interface between the CU and the DU. The transceiver 94 may be divided into a transmitter and a receiver for wireless interface communication. Transceiver 91 may be connected to processor 93 and memory 92 via bus 90.

Processor 93 is responsible for managing bus 90 and general processing, and memory 92 may be used to store data used by processor 93 to execute operations.

Figure 10:
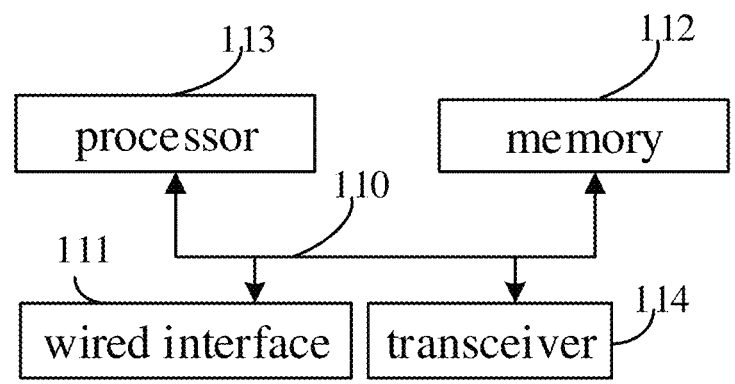
FIG. 10 is a schematic diagram of a DU according to an embodiment of the present disclosure.

Referring to FIG. 10, an embodiment of the present disclosure also provides a DU including a wired interface 111, a memory 112, a processor 113, a transceiver 114, and a computer program stored on the memory 112 and executed by the processor 113.

The wired interface 111 is configured to receive channel reconstruction indication information sent by a CU, send a response message to the CU, generate an RRC reconfiguration message by the CU based on the response message, and send the RRC reconfiguration message to the UE, so that the UE performs a corresponding operation.

The DU in the disclosed embodiment can perform a specific layer 2 behavior under the control of the CU to meet different characteristic requirements, so as to determine how the CU and the DU cooperate in the CU-DU architecture to complete important functions including bearer conversion, security key update, and the like, thereby improving system efficiency, and improving user experience.

In an embodiment of the present disclosure, optionally, the wired interface 111 is further configured to: receive layer 2 reset indication information or synchronization reconfiguration indication information sent by the CU; the layer 2 reset indication information or the synchronization reconfiguration indication information is used to instruct the DU to perform a layer 2 reset operation or to instruct the DU to perform a synchronization reconfiguration operation.

Optionally, the wired interface 111 is further configured to: receive the layer 2 reset indication information or synchronization reconfiguration indication information sent by the CU through one indication bit in a UE context modification message; or receive the layer 2 reset indication information or synchronization reconfiguration indication information sent by the CU through a UE movement instruction message.

Optionally, the wired interface 111 is further configured to: send synchronization configuration parameter information to the CU.

Optionally, the wired interface 111 is further configured to: send the synchronization configuration parameter information to the CU in an RRC container mode.

Optionally, the response message carries the downlink transmission address newly allocated by the DU for each DRB.

Optionally, after receiving layer 2 reset indication information or synchronization reconfiguration indication information sent by the CU, the processor 113 is further configured to: perform a layer 2 reset operation (i.e., a synchronous reconfiguration operation) based on the layer 2 reset indication information or the synchronous reconfiguration indication information.

Optionally, the wired interface 111 is further configured to: stop air interface transmission, and deliver uplink PDCP PDU data on all DRBs received from the UE to the CU in an out-of-order manner, and send downlink transmission status information or other indication information requesting transmission of new data to the CU.

The processor 113 is configured to clear all data packets of each buffer corresponding to the UE.

Optionally, the downlink transmission status information includes old data transmission complete indication information.

Optionally, the channel reconstruction indication information is used to indicate a bearer on which a logical channel needs to be reconstructed and to instruct the DU to perform a logical channel reconstruction operation for the bearer on which the logical channel needs to be reconstructed.

Optionally, the wired interface 111 is further configured to: receive the channel reconstruction indication information sent by the CU through a display indication bit in a UE context modification message; or receive the channel reconstruction indication information implicitly transmitted by the CU by adding or deleting a DRB in a UE context modification message.

Optionally, the wired interface 111 is further configured to: send new logical channel identification information to the CU.

Optionally, the wired interface 111 is further configured to: send the new logical channel identification information to the CU through an RRC container mode.

Optionally, the response message carries downlink transmission address newly allocated by the DU for the bearer on which the logical channel needs to be reestablished.

Optionally, after receiving the channel reconstruction indication information sent by the CU, the processor 113 is further configured to: perform a logical channel reconstruction operation for the bearer on which the logical channel needs to be reconstructed based on the channel reconstruction indication information.

Optionally, the wired interface 111 is further configured to: send uplink PDCP PDU data received from the UE on the bearer on which the logical channel needs to be reconstructed to the CU in an out-of-order manner, and send downlink transmission status information or other indication information requesting transmission of new data to the CU.

The processor 113 is further configured to clear all data packets of each buffer carrying corresponding to the bearer on which the logical channel needs to be reconstructed.

Optionally, the downlink transmission status information includes old data transmission complete indication information.

Figure 11:
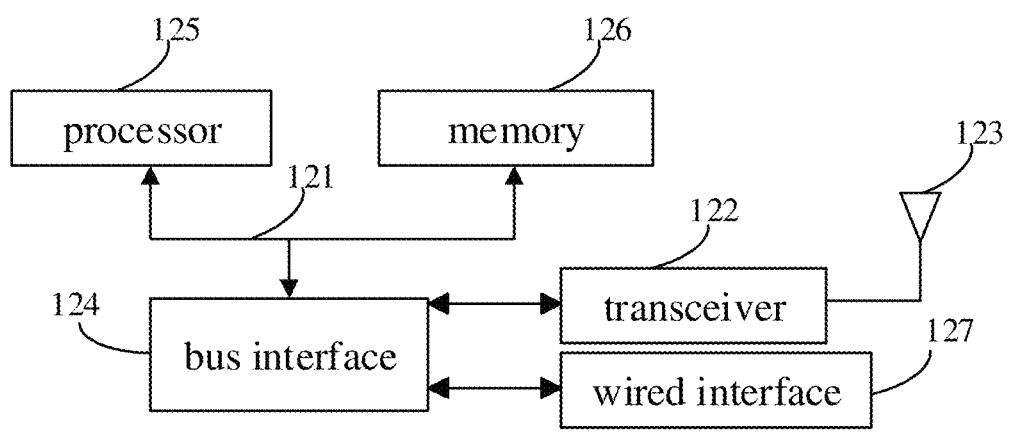
FIG. 11 is a schematic diagram of a network unit according to an embodiment of the present disclosure.

In FIG. 11, the bus architecture is represented by a bus 110, which may include any number of interconnected buses and bridges, which connect together various circuits including one or more processors represented by a processor 113 and a memory represented by a memory 112. The wired interface 111 is the interface between the CU and the DU. The transceiver 114 may be divided into a transmitter and a receiver for wireless interface communication. Transceiver 114 may be coupled to processor 113 and memory 112 via bus 110.

Processor 113 is responsible for managing bus 110 and general processing, and memory 112 may be used to store data used by processor 113 to execute operations.

In addition, an embodiment of the present disclosure further provides a network unit including a memory, a processor, and a computer program stored in the memory and executed by the processor. When the computer program is executed by the processor, each of the processes in the above-described layer 2 processing method can be realized, and the same technical effect can be achieved. To avoid repetition, details are not described herein. The network unit may be a CU or a DU.

Specifically, referring to FIG. 11, an embodiment of the present disclosure further provides a network unit including a bus 121, a transceiver 122, an antenna 123, a bus interface 124, a processor 125, a memory 126, and a wired interface 127.

In an embodiment of the present disclosure, the network unit further comprises a computer program stored on the memory 126 and executed by the processor 125.

When the network unit is a CU, the computer program executed by the processor 125 may perform the following steps: sending channel reconstruction indication information to the DU; receiving a response message sent by the DU; generating an RRC reconfiguration message based on the response message; sending the RRC reconfiguration message to a UE, and performing a corresponding operation by the UE.

When the network element is a DU, the computer program executed by the processor 125 may perform the following steps: receiving channel reconstruction indication information sent by a CU; sending a response message to the CU, generating an RRC reconfiguration message by the CU based on the response message, and sending the RRC reconfiguration message to the UE, so that the UE performs a corresponding operation.

In FIG. 11, a bus architecture (represented by bus 121), which may include any number of interconnected buses and bridges, links together various circuits including one or more processors represented by processor 125 and memory represented by memory 126. Bus 121 may also link various other circuits, such as peripherals, voltage regulators, and power management circuits, all of which are well known in the art and therefore will not be described further herein. Bus interface 124 provides an interface between bus 121 and transceiver 122. The transceiver 122 may be an element or may be a plurality of elements, such as a plurality of receivers and transmitters, providing units for communicating with various other devices on the transmission medium. The data processed by the processor 125 is transmitted over the wireless medium through the antenna 123, which further receives the data and transmits the data to the processor 125. The wired interface 127 is the interface between CU and DU in the CU-DU architecture.

The processor 125 is responsible for managing the bus 121 and general processing, and may also provide various functions, including timing, peripheral interfaces, voltage regulation, power management, and other control functions. The memory 126 may be used to store data used by the processor 125 to execute operations.

Alternatively, the processor 125 may be a Central Processing Unit (CPU), an Application Specific Integrated Circuit (ASIC), a Field Programmable Gate Array (FPGA), or a Complex Programmable Logic Device (CPLD).

An embodiment of the present disclosure further provides a computer readable storage medium having a computer program stored thereon, the computer program, when executed by a processor, implements the processes of the above-described layer 2 processing method, and achieves the same technical effect. To avoid repetition, details are not described herein.

Specifically, when a computer readable storage medium is applied to a CU, the computer program, when executed by a processor, may perform the following steps: sending channel reconstruction indication information to the DU; receiving a response message sent by the DU; generating an RRC reconfiguration message based on the response message; sending the RRC reconfiguration message to a UE, and performing a corresponding operation by the UE.

When the computer readable storage medium is applied to the DU, the computer program, when executed by the processor, may perform the following steps: receiving channel reconstruction indication information sent by the CU; sending a response message to the CU, generating an RRC reconfiguration message by the CU based on the response message, and sending the RRC reconfiguration message to the UE, so that the UE performs a corresponding operation.

Computer-readable medium include both permanent and non-permanent, removable and non-removable medium, and information storage may be implemented by any method or technique. The information may be computer readable instructions, data structures, modules of a program, or other data. Examples of computer storage medium include, but are not limited to, Phase-Change RAM (PRAM), Static Random-Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memory technology, Compact Disc Read-Only Memory (CD-ROM), Digital Video Disc (DVD) or other optical storage, magnetic cassettes, magnetic disk storage or other magnetic storage devices, or any other non-transmission medium that can be used to store information accessible by a computing device. As defined herein, a computer-readable medium does not include a transitory media, such as a modulated data signal and a carrier wave.

It is to be noted that, in this context, the terms "comprises," "comprising," or any other variation thereof, are intended to cover a non-exclusive inclusion, such that a process, method, article, or apparatus including a series of elements includes not only those elements but also other elements not expressly listed, or also includes elements inherent to such process, method, article, or apparatus. Without more limitations, the element defined by a phase "including a" does not rule out there are additional identical elements in a process, method, article, or apparatus that includes the element.

The above-described serial numbers of the disclosed embodiments are for the purpose of description only and do not represent the advantages or disadvantages of the embodiments.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A layer 2 processing method applied for a central unit (CU), comprising:
   sending channel reconstruction indication information to a distributed unit (DU);
   receiving a response message sent by the DU;
   generating a Radio Resource Control (RRC) reconfiguration message based on the response message; and
   sending the RRC reconfiguration message to a user equipment (UE), and performing, by the UE, a corresponding operation;
   wherein the sending channel reconstruction indication information to a distributed unit (DU) comprises:
   sending layer 2 reset indication information or synchronization reconfiguration indication information to the DU,
   wherein the layer 2 reset indication information or the synchronization reconfiguration indication information is used to instruct the DU to perform a layer 2 reset operation or to instruct the DU to perform a synchronization reconfiguration operation;
   wherein the sending layer 2 reset indication information or synchronization reconfiguration indication information to the DU comprises:
   sending the layer 2 reset indication information or the synchronization reconfiguration indication information to the DU through a UE movement instruction message;
   wherein the sending the layer 2 reset indication information or the synchronization reconfiguration inclination information to the DU through a UE movement instruction message comprises:
   sending implicitly the layer 2 reset indication information or the synchronization reconfiguration indication information to the DU by not carrying an RRC message in the UE movement instruction message: or
   sending the layer 2 reset indication information or the synchronization reconfiguration indication information to the DU by indicating that a handover target cell is a current serving cell in the UE movement instruction message.

2. The layer 2 processing method according to claim 1, wherein the receiving a response message sent by the DU comprises:
   receiving synchronization configuration parameter information sent by the DU,
   wherein the receiving synchronization configuration parameter information sent by the DU comprises:
   receiving the synchronization configuration parameter information sent by the DU in an RRC container mode,
   wherein the synchronization configuration parameter information includes dedicated access resource information for synchronization and/or a user identity on a new target resource.

3. The layer 2 processing method according to claim 1, wherein the response message carries a downlink transmission address newly allocated by the DU for each Data Radio Bearer (DRB).

4. The layer 2 processing method according to claim 1, wherein after the sending layer 2 reset indication information or synchronization reconfiguration indication information to the DU, the method further comprises:
   receiving uplink Packet Data Convergence Protocol (PDCP) protocol data unit (PDU) data on all DRBs received from the UE sent by the DU, and
   receiving downlink transmission status information or other indication information requesting transmission of new data sent by the DU.

5. The layer 2 processing method according to claim 4, wherein after the receiving downlink transmission status information sent by the DU or other indication information requesting transmission of new data, the method further comprises:
   enabling a new key of encryption and decryption for all DRBs; or
   enabling a new key of encryption and decryption for all DRBs based on the response message from the DU; or
   enabling a new key of encryption and decryption for all DRBs based on PDCP status report information from the UE; or
   enabling a new key of encryption and decryption for all the DRBs based on the RRC reconfiguration complete message from the UE; or
   enabling a new key of encryption and decryption for all DRBs after a local timer expires, wherein the local timer is enabled after the layer 2 reset indication information or the synchronization reconfiguration indication information is sent.

6. The layer 2 processing method according to claim 4, wherein the downlink transmission status information comprises old data transmission complete indication information.

7. The layer 2 processing method according to claim 4, wherein after receiving downlink transmission status information or other indication information for requesting transmission of new data sent by the DU, the method further comprises:

enabling a new key of encryption and decryption for all the Signaling Radio Bearers (SRBs) based on downlink transmission status information of any DRB or other indication information for requesting transmission of new data; or enabling a new key of encryption and decryption for all SRBs based on the response message from the DU; or enabling a new key of encryption and decryption for all SRBs after a local timer expires, the local timer is started after the layer 2 reset indication information or the synchronization reconfiguration indication information is sent.

8. The layer 2 processing method according to claim 1, wherein the corresponding operation performed by the UE is the layer 2 reset operation or a reconstruction operation of logic channels corresponding to all bearers.

9. The layer 2 processing method according to claim 1, wherein the channel reconstruction indication information is used to indicate a bearer on which a logical channel needs to be reconstructed and instruct the DU to perform the logical channel reconstruction operation for the bearer on which the logical channel needs to be reconstructed, wherein the sending channel reconstruction indication information to the DU comprises: sending the channel reconstruction indication information to the DU through a display indication bit in a UE context modification message; or sending implicitly the channel reconstruction indication information to the DU by adding or deleting a DRB in the UE context modification message.

10. The layer 2 processing method according to claim 9, wherein the receiving the response message sent by the DU comprises:

receiving new logical channel identification information sent by the DU, wherein the receiving new logical channel identification information sent by the DU comprises: receiving the new logical channel identification information sent by the DU in the RRC container mode.

11. The layer 2 processing method according to claim 9, wherein the response message carries a downlink transmission address newly allocated by the DU for the bearer on which the logic channel needs to be reconstructed.

12. The layer 2 processing method according to claim 9, wherein after sending the channel reconstruction indication information to the DU, the method further comprises:

receiving the uplink PDCP PDU data on the bearer on which the logical channel needs to be reconstructed which is received from the UE sent by the DU; and receiving the downlink transmission status information or other indication information requesting transmission of new data sent by the DU, wherein the downlink transmission status information comprises old data transmission complete indication information.

13. The layer 2 processing method according to claim 12, wherein after receiving the downlink transmission status information or other indication information requesting transmission of new data sent by the DU, the method further comprises:

processing a PDU corresponding to the uplink PDCP PDU data.

14. The layer 2 processing method according to claim 9, wherein the corresponding operation performed by the UE is a reconstruction operation of logic channels corresponding to the bearer on which the logic channel needs to be reconstructed.

15. A layer 2 processing method applied for a DU, comprising:

receiving channel reconstruction indication information sent by a CU; sending a response message to the CU, generating an RRC reconfiguration message by the CU based on the response message, and sending the RRC reconfiguration message to a UE, so that the UE performs a corresponding operation, wherein the receiving channel reconstruction indication information sent by a CU comprises:

receiving layer 2 reset indication information or synchronization reconfiguration indication information sent by the CU, wherein the layer 2 reset indication information or the synchronization reconfiguration indication information is used to instruct the DU to perform a layer 2 reset operation or to instruct the DU to perform a synchronization reconfiguration operation;

wherein the receiving layer 2 reset indication information or synchronization reconfiguration indication information sent by the CU comprises:

receiving the layer 2 reset indication information or the synchronization reconfiguration indication information sent by the CU through a UE movement instruction message;

wherein the receiving the layer 2 reset indication information or the synchronization reconfiguration inclination information sent by the CU through a UE movement instruction message comprises:

receiving the layer 2 reset indication information or the synchronization reconfiguration indication information sent implicitly by the CU by not carrying an RRC message in the UE movement instruction message: or receiving the layer 2 reset indication information or the synchronization reconfiguration indication information sent the CU by indicating that a handover target cell is a current serving cell in the UE movement instruction message.

16. A DU comprising a wired interface, a memory, a processor, a transceiver, and a computer program stored on the memory and executed by the processor, the wired interface is configured to implement the layer 2 processing method according to claim 15.

17. A CU, comprising a wired interface, a memory, a processor, a transceiver, and a computer program stored on the memory and executed by the processor, wherein, the wired interface is configured to send channel reconstruction indication information to a DU and receive a response message sent by the DU;

the processor is configured to read a program in the memory and perform a process of generating an RRC reconfiguration message based on the response message;

the transceiver is configured to send the RRC reconfiguration message to a UE, and the UE performs a corresponding operation, wherein the wired interface is further configured to send layer 2 reset indication information or synchronization reconfiguration indication information to the DU, wherein the layer 2 reset indication information or the synchronization reconfiguration indication information is used to instruct the DU to perform a layer 2 reset operation or to instruct the DU to perform a synchronization reconfiguration operation;

wherein the wired interface is further configured to: send the layer 2 reset indication information or the synchronization reconfiguration indication information to the DU through a UE movement instruction message;

wherein the wired interface is further configured to: implicitly send the layer 2 reset indication information or the synchronization reconfiguration indication information to tire DU by not carrying an RRC message in the UE movement instruction message; or send the layer 2 reset indication information or the synchronization reconfiguration indication information to the DU by indicating that a handover target cell is a current serving ceil in the UE movement instruction message.

* * * * *